United States Patent Office 3,056,717
Patented Oct. 2, 1962

3,056,717
DEPOSITION OF SYNTHETIC RUBBER ON DYE-STUFF-REACTED ASBESTOS FIBERS
David A. Feigley, Jr., and Leonard N. Ray, Jr., Manor Township, Lancaster County, Pa., assignors to Armstrong Cork Company, Lancaster, Pa., a corporation of Pennsylvania
No Drawing. Filed Apr. 15, 1958, Ser. No. 728,533
15 Claims. (Cl. 162—155)

This invention relates generally to fibrous products and more particularly to water-laid products of chrysotile asbestos fibers. Still more particularly, the invention relates to the deposition of the rubber content of a synthetic rubber latex upon chrysotile asbestos fibers while in suspension in water, and thereafter forming the resulting slurry of coated fibers into products such as sheets and the like.

The production of asbestos products by the beater saturation process has always presented difficult problems. The methods which gave good results with cellulose fibers failed completely when applied to asbestos fibers. Asbestos fibers in water produce an ion-filled solution having a relatively high pH. When synthetic rubber latices are added to such a slurry, clumping promptly occurs. Thus it has been necessary in the past to devise particular processes—different from those with cellulosic fibers—which will allow the even deposition of a rubber binder onto asbestos fibers in order that products may be formed therefrom. One successful process to accomplish this result is known as the citrate process and is fully described in U.S. Patent 2,759,813—Feigley, issued August 21, 1956. The citrate process is highly effective. However, it is desirable to have alternate processes which give the excellent results of the citrate process but which are more economical and which produce products which are different and more pleasing to the eye than those capable of being produced by the citrate process.

It is the primary object of the present invention to present a product and process wherein asbestos fibers are treated to impart color to the fibers and at the same time render those fibers susceptible to deposition thereon of the rubber content of a synthetic rubber latex. It is a further object of the present invention to present a simple, economical, easily controlled process for the production of pleasantly colored products from rubber-coated asbestos fibers.

A simple flow diagram of the process follows:

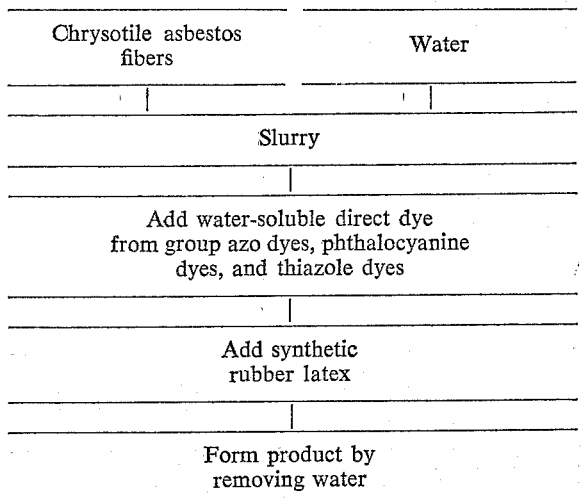

The invention contemplates forming a slurry of chrysotile asbestos fibers in water. To this slurry there is added a water-soluble, direct dye selected from the group consisting of azo dyes, phthalocyanine dyes, and thiazole dyes. The water-soluble, direct dye reacts with the surfaces of the chrysotile asbestos fibers, thus coloring those surfaces and rendering them receptive to deposition thereon of a rubber binder. A synthetic rubber latex is then added to the dye-treated slurry. Simple agitation then brings about deposition of the rubber content of the synthetic rubber latex onto the dye-treated chrysotile asbestos fibers. The resulting slurry of evenly coated chrysotile asbestos fibers is then formed into a product such as a sheet.

The slurry of chrysotile asbestos fibers may be formed in known manner. The fibers are added to sufficient water in a chest or other convenient container in an amount such that the resulting slurry contains about 0.3–3% by weight fibers. The preferred consistency of the slurry is about 1% by dry weight asbestos based on the total weight of the slurry. The slurry will be subjected to mechanical refining as in a beater, Jordan engine, disc refiner, or the like to produce a slurry wherein the fibers have been reduced to the desired degree of length and diameter. Refining will generally be equivalent to that produced in about 5–15 minutes in a Valley laboratory beater with standard weights.

The slurry is then ready for the addition of the water-soluble, direct dye. The phrase "direct dye" is used in the sense taught by the dyestuff industry, namely, a direct dye is one which is substantive to cotton without further treatment; a direct dye will dye cotton by mere addition of the dye to an aqueous medium containing the cotton to be dyed. The direct dyes contemplated for use in the present invention are contained in one or more of three chemical classifications of dyestuffs, namely, azo dyes, phthalocyanine dyes, and thiazole dyes. Any dye which is direct and which falls into one of these three chemical classes is operable in the present invention.

The particular dye within the class suitable for use in the present invention will be selected primarily on the basis of effectiveness, availability, and cost. Mixtures of dyes can be used if desired. The amount of dye to be used is very small since a little bit of the dye goes a long way in the present process. The amount of dye to be used will generally be in the range of about 0.1–1% by weight dye based on the dry weight of the asbestos fibers. Within this range the preferred amount will generally be .3–.6% by weight dye based on the dry weight of the asbestos.

In this application the various dyes will be identified primarily by the new Color Index (CI) numbers rather than by the unwieldly chemical structures. Each of the new Color Index numbers identifies one and only one dye having a specific chemical structure, or the procedure for preparing that dye. The precise chemical formula or method of synthesis for each dye described herein can be obtained by reference to the publication, Colour Index, Second Edition, volumes 1, 2, 3, and 4, published by The Society of Dyers and Colourists, and The American Association of Textile Chemists and Colorists, 1956. Certain dyes as purchased are actually composed of two closely related dyes; and hence two Color Index numbers are used to describe them.

The dye is most conveniently added to the slurry of asbestos fibers in the form of a water solution. The dye solution may simply be poured into the chest or other container containing the asbestos slurry. The resulting mixture should be agitated in order to give the dye the opportunity to react with all the surface of the asbestos fiber. Such reaction generally takes place within ten minutes and more usually within five minutes. The end point of the reaction between the dye and the fibers is readily determined by noting that the dye is no longer present in the water phase of the slurry. However, slight excess of dye in water does not adversely affect the process. The reaction of the dye with the asbestos fibers does not produce any noticeable physical change in the asbestos slurry. The Canadian 3-gram freeness of the 1% consistency asbestos slurry was about 50 prior to the addition of the dye and it remains at 50 after the dye has reacted with the asbestos. Chemically, however, the individual asbestos fibers have been greatly modified. If a synthetic rubber latex were to be added to the slurry prior to the dye addition, the rubber simply forms balls and agglomerates, and the entire slurry is useless. However, when the rubber latex is added subsequent to the reaction of the proper amount of dye with the asbestos fibers, the rubber content of the synthetic rubber latex smoothly and evenly deposits onto the dye-reacted fibers with no outside aid save agitation. Thus it can be seen that the dyes are used in the present invention as chemicals to modify the chemical characteristics of asbestos fibers in a manner which allows the rubber to deposit on the fibers. The mechanism of the reaction between the dye and the chrysotile asbestos fibers is not understood. In any case, once the dye has reacted with the asbestos fibers, the slurry is then ready for the addition of the synthetic rubber latex.

The latex to be added may be any of a number of synthetic rubbers used in the practice of conventional beater saturation methods. Typical of these synthetic rubbers are the products known as GR-S (SBR) which are copolymers of butadiene and styrene containing about 50% to about 70% by weight butadiene. There may also be used the rubbers designated as Buna N, or Hycar (NBR); these are copolymers of butadiene and acrylonitrile containing about 50% to about 80% by weight butadiene. The neoprenes (CR) may also be used. The neoprenes are polymers of 2-chloro-butadiene-1,3, which polymers are also known as polychloroprene. There may be employed the homopolymers of butadiene (BR) as well as homopolymers and/or copolymers of butadiene homologues such as the isoprene rubbers (IR). These are the materials which are generally designated as synthetic rubbers herein. They may be more specifically designated as rubber-like polymers of butadiene, isoprene, and chloroprene, and rubber-like copolymers of butadiene or isoprene with copolymerizable vinyl compounds such as styrene and acrylonitrile. These synthetic rubbers are added to the slurry in the form of their latices. The latices normally contain about 25% to about 50% by weight rubber solids. The latices contain additional compounding ingredients such as stabilizers and the like which are well-known to the art and which form no part of the present invention.

The synthetic rubber latex is added as such to the dye-treated slurry of asbestos fibers. The entire mass is agitated whereby it will be found that the rubber content of the synthetic rubber latex will deposit evenly and smoothly onto the dye-reacted chrysotile asbestos fibers. The resulting slurry of rubber-coated fibers is then formed into a product such as a sheet either on conventional papermaking equipment such as a Fourdrinier wire or cylinder machine, or in shaped molds which allow the draining of the water while retaining the rubber-coated fibers.

The amount of rubber to be deposited on the fibers may be selected in accordance with the requirements of the final product. Generally speaking, the amount of rubber deposited on the fibers will be in the range of about 10%–75% by weight rubber based on the dry weight of the fibers. Where the final product is to be a sheet from which gaskets are to be cut, the amount of rubber in the sheet will be adjusted in accordance with the requirements of the particular use for the particular gasket. Most frequently it will be found that about 20%–30% by weight rubber based on the dry weight of the asbestos fibers yields good all-around sheet goods which lend themselves to gasketing applications and to use of the product as a backing for floor covering material such as plastic flooring sheets and tiles.

The following examples illustrate several embodiments of the invention. All parts are by weight unless otherwise stated.

*Example I*

Into 12,000 parts of water was placed 240 parts chrysotile asbestos fibers (5D) and the slurry was beaten for 15 minutes. Slurry samples containing 37.5 parts (dry basis) asbestos were withdrawn and diluted to 1% consistency to give a series of slurries in which each slurry contained 37.5 parts asbestos and 3,750 parts water. To each slurry was added 0.15 part of the rubber antioxidant, Flectol H, which is polymerized 1,2-dihydro-2,2,4-trimethylquinoline, followed by 0.5 part of an azo direct dye. After agitation there was added 18.8 parts of a 40% solids butadiene-styrene copolymer latex (GR-S 2,000) and gentle agitation was maintained in the mixture.

The table below identifies the particular dyes used and also states the time required for the rubber to completely precipitate onto the asbestos fibers. The Canadian 3-gram freeness is the freeness found in the slurry after complete deposition of the rubber onto the asbestos fibers. Following are the results:

| Class of Azo Dye | Name of Dye | Color Index Number | Precipitation Time, Minutes | Canadian Freeness |
|---|---|---|---|---|
| Benzidine | Congo Red | 22,120 | 9 | 10 |
| Do | Benzopurpurin 4B | 23,500 | 22 | 780 |
| Do | Calcomine Yellow Brown K Ex. | 30,045<br>30,110 | 12 | 510 |
| Stilbene | Stilbene Yellow GA. | 40,000 | 7 | 30 |
| Do | Pontamine Fast Orange 6RN. | 40,002<br>40,003 | 5 | 80 |
| Do | Pontamine Yellow S3G. | 40,001<br>40,006 | 8 | 670 |
| Do | Pontamine Yellow SXP. | 40,001<br>40,006 | 5 | 90 |
| Aminonaphthol Sulfonic Acid. | Pontamine Green BXN. | 30,295 | 9 | 470 |
| Do | Pontamine Fast Scarlet 4BA. | 29,185 | 9 | 80 |
| Do | Pontamine Sky Blue 5BX. | 24,400 | 8 | 270 |
| Do | Pontamine Sky Blue 6BX. | 24,410 | 8 | 220 |
| Heterocyclic Intermedate. | Erie Fast Orange G. | 22,375<br>22,430 | 14 | 650 |

Certain of the above dyes yield rubber-coated fibers having quite low Canadian freenesses. This situation illustrates that those particular dyes are extraordinarily effective and need not be used in as large amounts as were actually used in this series.

*Example II*

Example I was repeated save that the direct dye added to the asbestos slurry was a phthalocyanine dye. The three dyes listed below are actually the same dye by chemical definition but they were purchased from different sources. Following are the results:

| Name of Dye | Color Index Number | Precipitation Time, Minutes | Canadian Freeness |
|---|---|---|---|
| Pontamine Fast Turquoise 8GL | 74,180 | 6 | 290 |
| Pontamine Fast Turquoise 8GLD | 74,180 | 9 | 440 |
| Fastusol Turquoise Blue LGA | 74,180 | 8 | 440 |

Example III

Example I was repeated save that a direct thiazole dye was used. Following are the results:

| Name of Dye | Color Index Number | Precipitation Time, Minutes | Canadian Freeness |
|---|---|---|---|
| Pontamine Pure Yellow MN | 19,540 | 7 | 390 |
| Pontamine Fast Yellow WBF | 19,555 | 5 | 220 |
| Titan Yellow | 19,540 | 6 | 350 |

The two dyes having the same color index number in the above table are the same dye purchased from different sources.

Example IV

A formulation was prepared in a chest for running over a commercial Fourdrinier wire. Following is the formula.

Ingredients: Amounts
- Asbestos, 5D _____ pounds __ 750
- Water _____ gallons __ 9,000
- Antioxidant (Flectol H) _____ pounds __ 3
- Pigment Black B Paste, 33⅓% solids _ do ____ 90
- Stilbene Yellow GA (CI 40,000) _____ do ____ 2.2
- Butadiene-Styrene copolymer latex (GR-S 2,000), 40% solids _____ pounds __ 375

All of the above ingredients except the dye and rubber were pulped together and passed through two Jordan engines in series. The refined pulp was pumped to a chest wherein the dye was added in the form of a water solution with agitation. After three minutes, the latex was slowly added with gentle agitation. Precipitation time was 15 minutes.

The resulting rubber-coated asbestos fibers in the water were passed to the head box of a commercial Fourdrinier wire on which a .062" caliper sheet was formed at the rate of 20 feet per minute. A black, strong asbestos sheet was formed which was useful for gasketing.

Example V

The following formulation was prepared and run on a commercial Fourdrinier wire as described in Example IV. The formulation is as follows.

Ingredients: Amounts
- Asbestos, 5D _____ pounds __ 750
- Water _____ gallons __ 9,000
- Antioxidant (Flectol H) _____ pounds __ 7.38
- Mapico Pigment #387 (iron oxide) ___ do ____ 30
- Pigment Black B Paste _____ do ____ 5.625
- Pontamine Fast Scarlet 4BA (CI 29,185) _____ do ____ 3.3
- Polychloroprene latex, 51% solids (Neoprene 750) _____ pounds __ 362

An excellent rubbed-bonded asbestos sheet of .062" caliper was formed at the rate of 20 feet per minute.

Example VI

A formulation was prepared and run over a commercial Fourdrinier wire as in Example IV. Following is the formulation.

Ingredients: Amounts
- Asbestos, 5D _____ pounds __ 750
- Water _____ gallons __ 9,000
- Pigment Black B Paste _____ pounds __ 22.5
- Mapico Pigment #387 _____ do ____ 120
- Zinc oxide _____ do ____ 7.5
- Altax (benzothiazyl disulfide) _____ do ____ 4.5
- Sulfur _____ pounds __ 4.5
- Pontamine Fast Scarlet 4BA (CI 29,185) _____ do ____ 5
- Butadiene-acrylonitrile copolymer latex, 41% solids (Hycar 1561) _____ pounds __ 367

An excellent strong rubber-bonded asbestos sheet resulted.

We claim:

1. A method of making a beater-saturated asbestos product comprising forming a slurry of chrysotile asbestos fibers in water, adding to said slurry a water-soluble, direct dye selected from the group consisting of azo dyes, phthalocyanine dyes, and thiazole dyes, which dye reacts with the surfaces of said chrysotile asbestos fibers, adding a synthetic rubber latex to the resulting slurry while agitating said slurry whereby the rubber content of said latex is evenly deposited on said chrysotile fibers, and forming the resulting slurry of coated fibers into a product by removing the water therefrom.

2. A method according to claim 1 wherein said synthetic rubber comprises a butadiene-styrene copolymer.

3. A method according to claim 1 wherein said rubber comprises a butadiene-acrylonitrile copolymer.

4. A method according to claim 1 wherein said rubber comprises a polychloroprene.

5. A method according to claim 1 wherein said direct dye is present on said fibers in an amount of about 0.1–1.5% by weight based on the dry weight of the fibers.

6. A method according to claim 5 wherein said amount is in the range of about 0.3–0.6% by weight.

7. A method according to claim 1 wherein said direct dye comprises an azo dye.

8. A method according to claim 1 wherein said dye comprises a phthalocyanine dye.

9. A method according to claim 1 wherein said dye comprises a thiazole dye.

10. A water-laid product comprising chrysotile asbestos fibers whose surfaces are reacted with a water-soluble, direct dye selected from the group consisting of azo dyes, phthalocyanine dyes, and thiazole dyes, said dye-reacted fibers having deposited thereon an outer coating of a synthetic rubber.

11. A product according to claim 10 wherein said synthetic rubber comprises a butadiene-styrene copolymer.

12. A product according to claim 10 wherein said synthetic rubber comprises a butadiene-acrylonitrile copolymer.

13. A product according to claim 10 wherein said synthetic rubber comprises a polychloroprene.

14. A product according to claim 10 wherein said synthetic rubber is present in an amount of about 10%–75% by weight based on the dry weight of said fibers.

15. A product according to claim 10 wherein said direct dye is present in an amount of about 0.1%–1.5% by weight based on the dry weight of said fibers.

References Cited in the file of this patent

UNITED STATES PATENTS

| | | |
|---|---|---|
| 1,956,053 | Tucker | Apr. 24, 1934 |
| 2,149,979 | Pace | Mar. 7, 1939 |
| 2,485,458 | Quinn | Oct. 18, 1949 |
| 2,626,213 | Novak | Jan. 20, 1953 |
| 2,661,288 | Barbaras | Dec. 1, 1953 |
| 2,666,699 | McQuiston | Jan. 19, 1954 |
| 2,698,788 | Greenman | Jan. 4, 1955 |
| 2,730,446 | Hutchins | Jan. 10, 1956 |
| 2,759,813 | Feigley | Aug. 21, 1956 |
| 2,769,713 | Wilson | Nov. 6, 1956 |
| 2,797,163 | Smith | June 25, 1957 |
| 2,807,543 | McQuiston | Sept. 24, 1957 |
| 2,930,106 | Wrotnowski | Mar. 29, 1960 |